May 28, 1957 D. M. JAMES 2,793,673
MANUFACTURE OF BUILT-UP WOOD PANEL
Filed Sept. 1, 1954 4 Sheets-Sheet 1
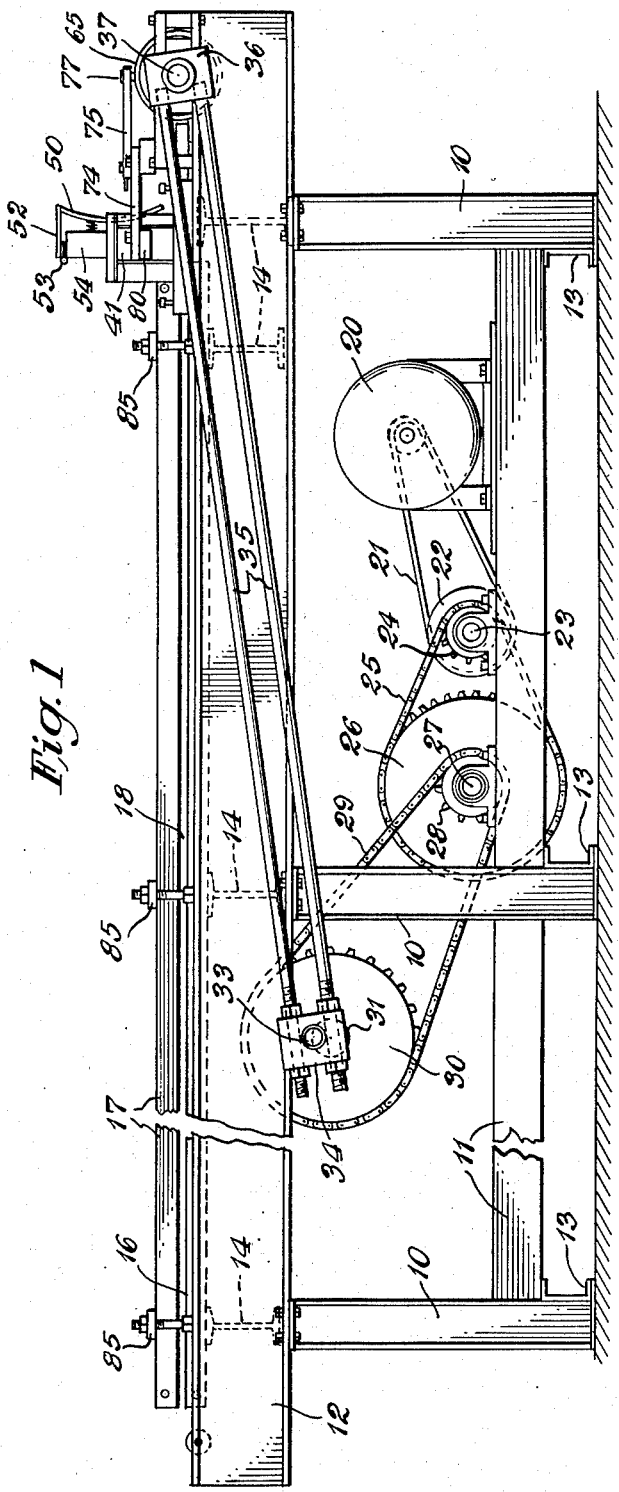
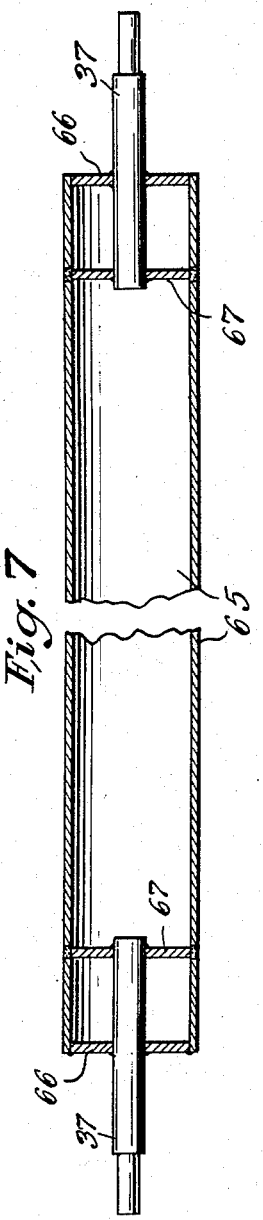
INVENTOR.
David M. James
BY W. Bartlett Jones,
Attorney

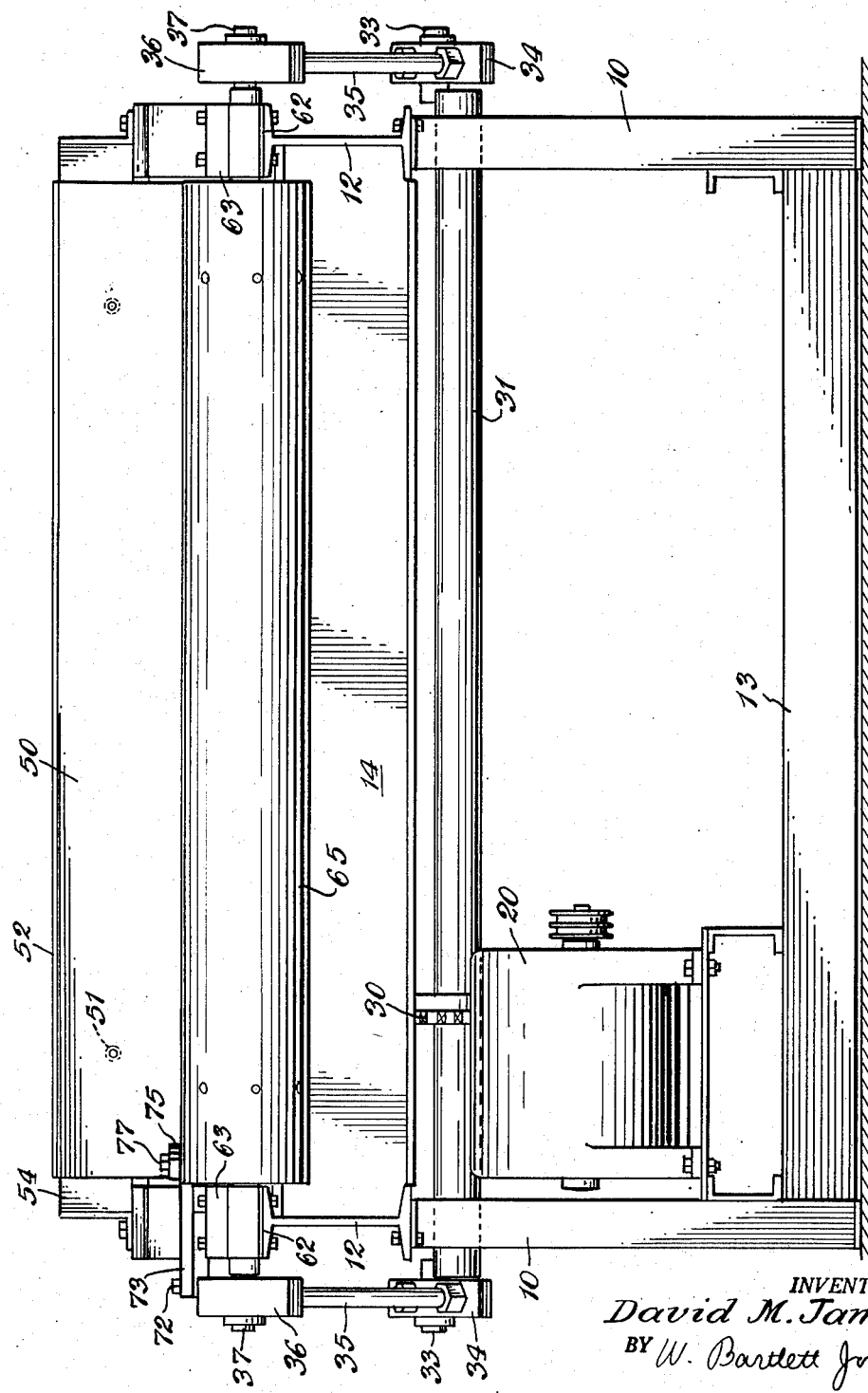

May 28, 1957  D. M. JAMES  2,793,673
MANUFACTURE OF BUILT-UP WOOD PANEL
Filed Sept. 1, 1954  4 Sheets-Sheet 3
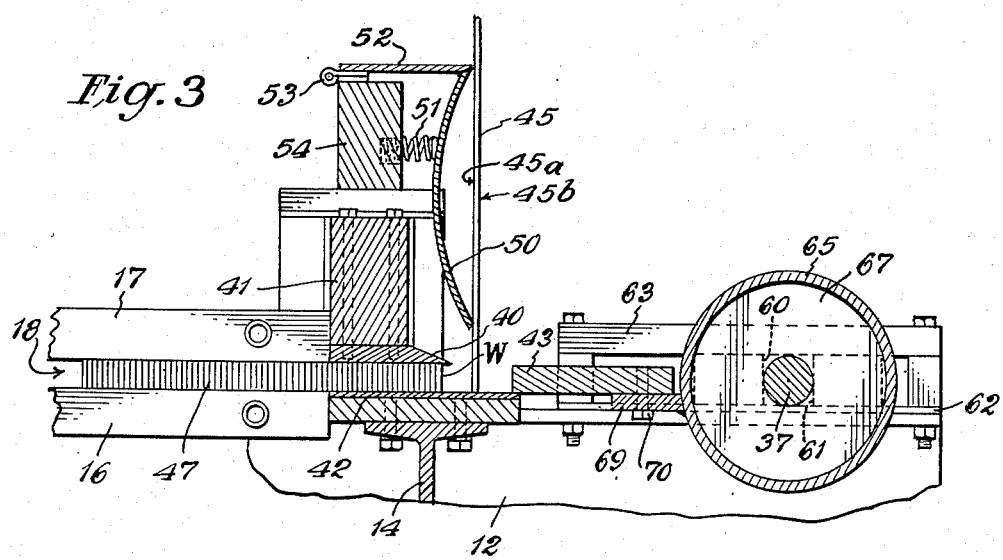
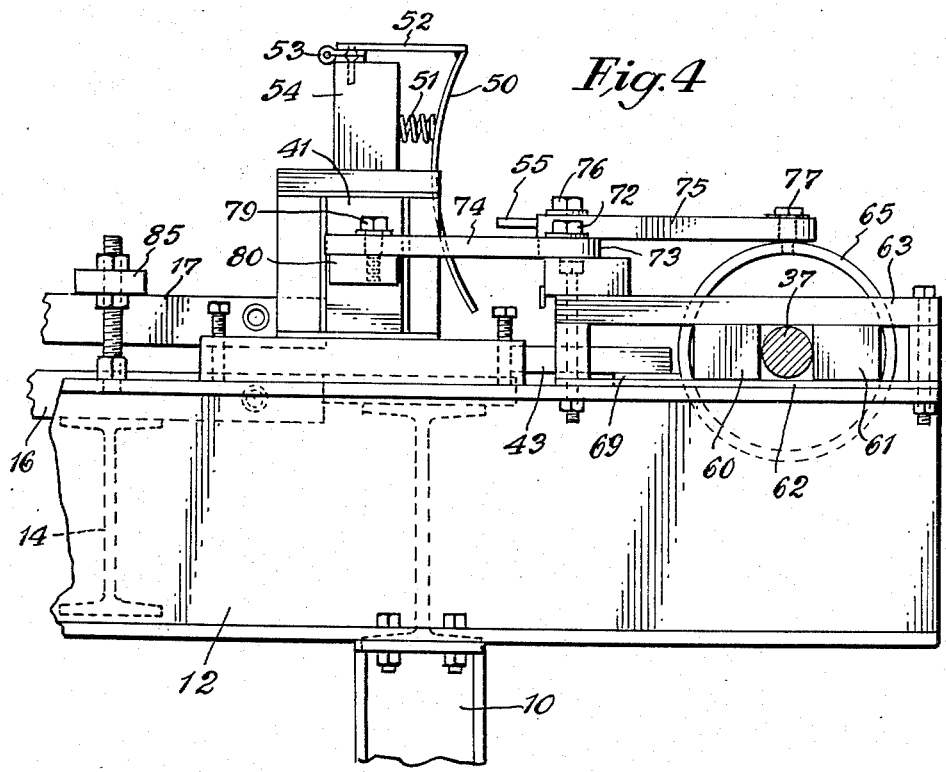
INVENTOR.
David M. James
BY
W. Bartlett Jones,
Attorney May 28, 1957  D. M. JAMES  2,793,673
MANUFACTURE OF BUILT-UP WOOD PANEL
Filed Sept. 1, 1954  4 Sheets-Sheet 4

INVENTOR.
David M. James
BY
W. Bartlett Jones,
Attorney

2,793,673

MANUFACTURE OF BUILT-UP WOOD PANEL

David M. James, Lexington, Ky.

Application September 1, 1954, Serial No. 453,533

18 Claims. (Cl. 154—1)

The present invention relates to the production of laminated panel structures, suitable for use as flooring or sub-flooring, and also particularly adapted for use as cores or body material for adhered facings on one or both sides of the core, in producing flush type doors, bench tops, table tops and the like. It has particular reference to the use of wood as the body material and to apparatus and method suitable for producing such structures from wood or other material.

In numerous prior art methods of making core-bodies and like panel stock, wood particles are mixed with a bonding agent and the mixture consolidated to panel form. The particles may be fiber, fiber bundles, sawdust, shavings or chips, either coarse or fine. In all such cases, the particles do not fit well together, leaving inter-particles voids which are lodging places for resin or other binder. Binder material so lodged in these voids is inefficiently used as binder, its mass being too large for its surface. As a consequence, for good bond in wood particle panels, a high usage of resin is required.

One object of the present invention is to provide efficiently bound panels with low usage of binder.

It is a particular object to assemble flat strip material as laminations in pile-form and to bond strip to strip in building up a panel.

A particular object of the invention is to provide the body material for the panel in form to minimize the formation of voids in which binder material is lodged and inefficiently used for bond.

It is also an object to provide a simple method and apparatus for continuously forming hot-bonded laminated panels from continuous supplies of sheet material and of heat-activatable binding material.

It is a particular object of the invention to effect a bond from wood to wood by the agency of heat and mechanical pressure while the wood being bonded moves relatively along the face of a heated platen under such conditions that frictional resistance contributes to the imposition of the required mechanical pressure.

Various other and ancillary objects and advantages of the invention will become apparent from the following description and explanation of the invention, in connection with the accompanying drawings in which:

Fig. 1 is a side view of the apparatus.

Fig. 2 is a rear view of the apparatus.

Fig. 3 is an enlarged fragmentary view of the feeding end of the machine in vertical cross-section, showing a wood sheet in position about to be servered into a strip.

Fig. 4 is a side view of the structure shown in Fig. 3.

Fig. 7 is a detailed fragmentary vertical cross-section of a portion of a reciprocating ram structure.

Figure 5:
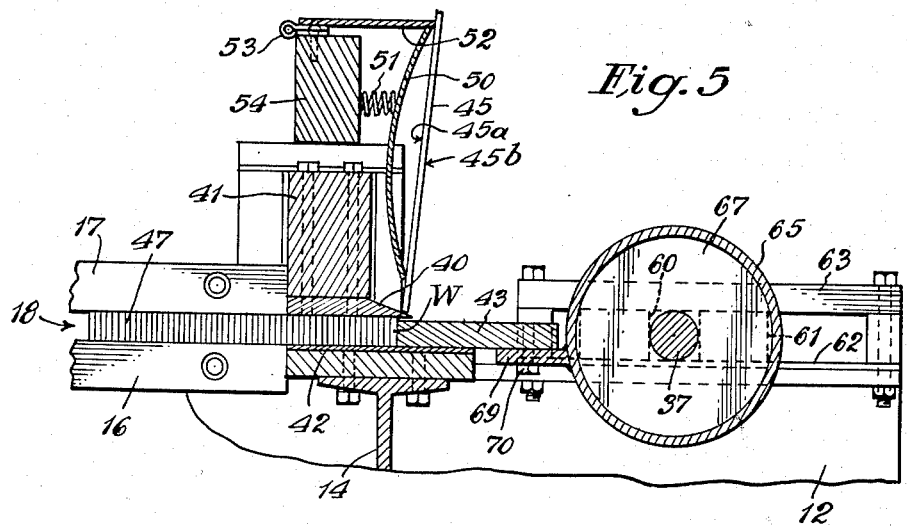
Fig. 5 is a view of the parts shown in Fig. 3 after movement to form a strip and to insert it in a pile to become the panel.

It is to be understood that the machine illustrated is merely exemplary of the apparatus and process and is not to be considered as limiting the invention short of its scope as expressed in the appended claims.

In considering the economic objective of low usage of binder, reference is made to the use of thermosetting binders upon which the success of the invention depends. As the term is used herein, "thermosetting binder" includes synthetic solid or liquid resins which set by the action of heat with or without loss of attendant volatile matter, and also fluid solutions or dispersions having a volatile vehicle, such as water, which on volatilization leaves a binder residue, such as starch, protein, gums and the like.

The efficient use of any binder calls for a high specific surface for the binder mass, as represented by a thin interfacial film of binder as a partition between two wood surfaces. In the present invention, wood particles are not used. The body material is provided as flat-sided strips, preferably of wood, each strip being of uniform thickness between parallel plane faces. The strips are assembled in pile-form facewise, thus providing an assembly which is herein referred to as a "pile" regardless of the direction in which it extends, because it may extend in any direction. In so assembling the strips, it is done in a manner to locate binder interfacially for each pair of adjacent strips. Thus, thin films of binder are used and voids are not formed, except here and there in the case of wood for example, where defects normal to whole wood present voids in a face of a strip.

The strips may be formed in any manner for arrangement in pile-form. The thickness of the strips may vary, as may the directions in which some property or structural feature is linear as in the case of the grain of wood. However, for uniformity of properties in a finished panel, the strips are preferably of uniform thickness and have their linear features extending generally in the same direction.

In the following description the invention is illustrated by the use of wood. By using sheets of wood veneer as the supply of wood the preferred structure of the panel may be achieved by a continuous process in the apparatus illustrated in the drawings.

A supply of sheet-form wood, such as one or more sheets of veneer, is fed to the machine in such a way that one end of a sheet is sheared away as a wood strip, and pushed into its place in a pile of previously formed strips. In doing this, binder is suitably present on one face of the strip when it joins the pile, and in such a distribution that every pair of adjacent strips has interfacial binder. In carrying the strip or strips to the pile, the cut-off material is rammed into a long narrow passageway into which it just fits and within which the pile is located and moved along by ramming a new single strip or more into place. The ram operates against friction of the pile as it moves in the passageway.

The passageway is divided into an elongated heating zone and a shorter entrance zone. The entrance zone of the passageway is relatively cool so as not to activate or set the binder. The temperature of the passageway increases as the depth increases and the major faces of the passageway, which constitute the heating zone, are heated platens which set the binder at that stage in the progress through the passageway where the strips are suitably compressed. Any vapor escapes endwise of the strips and along the platens via channels naturally resulting from the cut edges of the strips.

The process may be carried out in one way by the illustrative apparatus shown in Fig. 1. The numerals 10 designate supporting columns and the numerals 11 and 12 represent horizontal lower and upper longitudinal beams, all forming a framework in combination with lower cross-beams 13 and upper cross-beams 14.

The top is table-like and comprises two adjustably spaced platens 16 and 17 providing a passageway 18 between them in which the panel is continuously moved to the left in Fig. 1 as it is formed. The platens 16 and 17 are adapted to be heated to a temperature predetermined by the choice of resin to be set thereby. There is a feeding means for the panel-forming material at the right end (Fig. 1) including a reciprocal ram (later described), which is reciprocated by power means located beneath the platens.

The power means has a motor 20, connected by belt 21 to pulley 22 on axle 23. Small gear 24 on axle 23 is connected by chain 25 to large gear 26 on axle 27. Axle 27 bears small gear 28 connected by chain 29 to large gear 30 on cross-machine shaft 31.

Crank pins 33 are carried at the ends of shaft 31 as means to motivate the ram by a suitable connection. The pin 33 bears in pitman block 34, which has connecting rods 35 running to a second pitman block 36 swiveling slightly on shaft 37, and forming a part of the ram structure.

Fig. 2 shows that the structure described with reference to Fig. 1 is duplicated on the other side of the machine, and the parts are similarly numbered. In Fig. 2, it is to be observed that shaft 31 extends across the width of the machine. Shaft 37 is duplicated on both sides coaxially, as later described.

The function of the mechanical parts yet to be described will best be understood by reference to the process to be performed. In Fig. 3, there is shown the entrance end to the passageway 18 between the heated platens 16 and 17. This passageway 18 is extended at the top by the face of a member which is preferably a knife blade 40 mounted on the bottom face of a horizontally reciprocal head 41 (later described). The passageway 18 is extended at the bottom by a bed plate 42 reaching beyond the knife blade 40, and providing a bearing surface for ram block 43. Ram block 43 fits snugly into the passageway between the knife blade 40 and the bed plate 42, and its main function is to ram strips of wood into the pile thereof between the platens 16 and 17 and its described extension.

While it is possible to provide means to feed in succession to the space in front of the ram block 43 supplies of binder and of wood strips of width to enter the passageway, it is preferred to have the ram block 43 aid in forming the strips from one or more sheets of wood, such as veneer sheet 45. The numeral 45 actually designates but one sheet to facilitate explanation with reference to certain uses of binder, but it is to be understood that more than one sheet of veneer may be present. On this account, the said knife blade 40 is preferred.

As shown in Fig. 3, the vertically disposed feed of wood veneer 45 has its bottom end resting on bed plate 42 in the path of ram block 43. In Fig. 5, the parts have moved so that ram block 43 has entered the passageway between knife blade 41 and bed plate 42 and in doing so has severed one or more wood strips designated W from the veneer 45, and forced strip W against a pile 47 of similar strips filling the passageway. Repeated reciprocation of the ram provides pressure against the pile 47 which is resisted to a degree by the frictional engagement of the pile with the faces of the platens 16 and 17. By providing interfacial thermosetting binder for each two adjacent wood strips, the binder is activated by the heat and binds the pile into an integral structure. The bed plate 42 and knife blade 41 are unheated, except by conduction from the nearby platens 16 and 17. This unheated portion of the pile and the selection of the binder are mutually related so that at the region where the binder sets to immobility, the desired compression existing from one strip W to the next is retained during the withdrawal stroke of the ram. Thus, the friction of the pile 47 as a whole maintains the desired mechanical compression at the final setting of the binder.

Various means may be used for applying binder. Liquid binder may be present on the face 45$^a$ of the veneer (to keep the face of the ram free of such binder), or a sheet form of synthetic resin or of paper impregnated and coated with synthetic resin, may be fed along with the veneer at either face of it. The sheet 45 may be preliminarily coated on either face 45$^a$ or 45$^b$ by a rubber roll glue-spreader with liquid synthetic resin which can be dried or otherwise solidified to a dry thermosetting resin coat thereon. The liquid coat is then dried or otherwise solidified. Thus, the dry binder coat does not gum the parts and it remains solid until activated to adhesiveness by the heat from platens 16 and 17. The use of a dry binder coat on one face of the veneer sheet makes it very convenient to feed more than one sheet to be cut into strips.

Another way to apply the binder is to coat one face of the sheets of veneer with a thin coat of a liquid resin glue, such as is used in the production of plywood, and then stack the wet sheets for a half-hour or longer, during which time the liquid soaks into the wood, leaving resin solids coating and impregnating the face layer of the wood. The face so coated is therefore not covered with a liquid film as presented to the feeding mechanism. However, in operations coating but one face of each sheet and then piling, it has been found that the water from the glue effects waves and buckling of the sheet from flat form, thus giving unequal facial distribution within the pile. To effect uniform distribution, each face of each veneer sheet is coated and the sheets piled to effect the desired penetration. Thus, half of the glue-line at each interface in the panel comes from each strip of veneer. By this method, the required amount of glue per unit area of glue-line is less than conventionally used in plywood manufacture. By coating each face of the veneer sheet, the applied glue layer is thinner than when coating only one face, and the applied layer is less than half as thick as that produced in coating veneer for plywood. By this preferred method, uniform bonding in the panel is achieved, with exceptional strength. The softening of the resin in its thermoplastic stage takes place while the two adjacent wood strips are pressed together, giving excellent interfacial and penetrating bond.

To perform the functions indicated, certain mechanical actions minimize expected difficulties. For example, the knife blade 40 makes a cleaner cut when it moves as it cuts. However, it has been found that with some sheets, depending on the thickness, kind of wood, and grain, the knife 40 may be held stationary while the ram 43 forces the wood onto it. In other cases, slicing the wood by reciprocating the knife is more satisfactory. The knife blade 41 is arranged to remain stationary or to reciprocate. Therefore, means is provided for horizontally reciprocating the knife blade in timed relation with the action of the ram structure.

When the ram block 43 cuts strips W, it tends to crowd the fed veneer 45 onto the upper face of the knife blade 40, as shown in Fig. 5. To remove it, there is a resilient veneer guide 50 urged by spring 51 to push the veneer back to the position of Fig. 3, from the position of Fig. 5. The guide 50, integral with a plate 52 angular therewith, is hinged at 53 to cross-beam 54. Thus, it may be swung out of illustrated position. To remove the veneer guide 50 from the path of veneer 45 as the latter moves into cutting position, there are pushing fingers 55 on each side of the apparatus connected with the reciprocating ram structure, which reach to and push the guide away from the path of the veneer.

Figure 6:
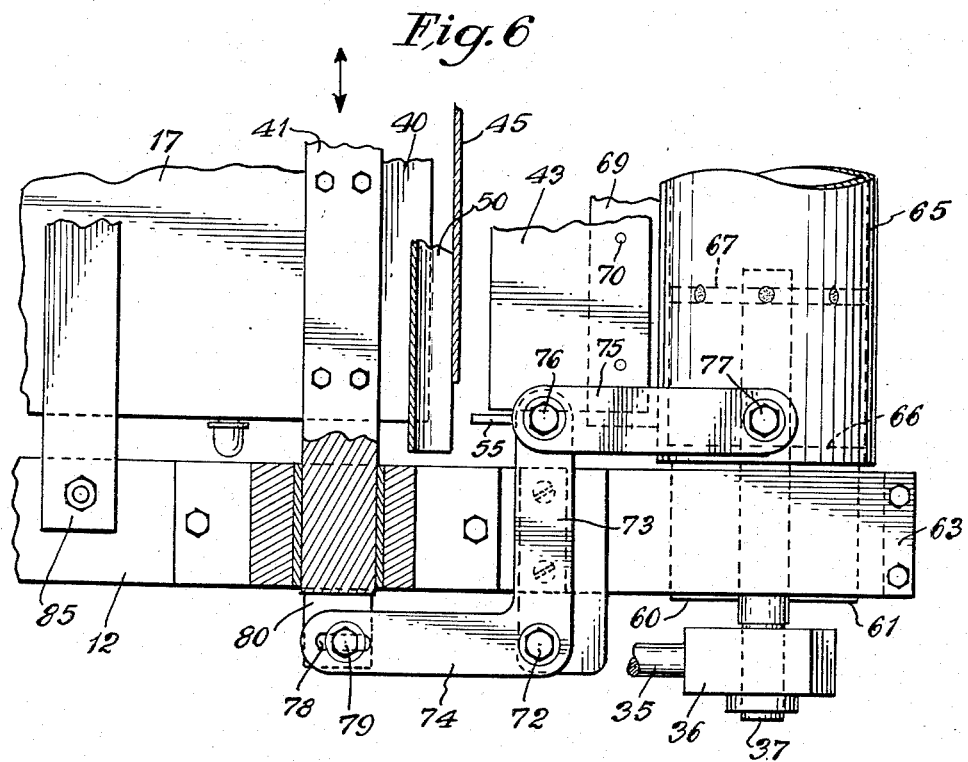
Fig. 6 is a plan view of the structure shown in Fig. 4.

The reciprocating ram structure is suitably operated by the movement of the coaxial shafts 37. Each shaft 37 is positioned between slide blocks 60 and 61, of height equal to the shaft diameter, and this assembly slides between ways 62 and 63, at each side of the machine. The assembly of blocks 60—61 and shaft 37 are held together with a tubular housing 65 located between the said pairs of ways (see Fig. 6), which housing reciprocates horizontally as a rigid carrier of the ram block 43. In Fig. 7, the tubular housing 65 is shown with end plates 66 welded to the housing, and spaced inwardly therefrom plates 67 also welded to the housing. These pairs of plates 66—67 have openings therein coaxially with the housing 65. In the openings of each pair is inserted and then welded the shafts 37 of which the free ends project to slide between the ways 62 and 63. In Figs. 3 and 5 is shown a horizontal wing plate 69 welded to the housing 65, to which the ram block 43 is attached by bolts 70.

The reciprocation of the ram structure longitudinally of the machine may be used when desired to reciprocate the knife blade across the machine. As an example of suitable means, there is shown a bell-crank pivoted at 72 with an arm 73 in the cross-machine direction and an arm 74 in the lengthwise direction. Arm 73 is connected by a link 75 pivoted to it at 76 and pivoted by a pin 77 to the tubular housing 65. The pushing finger 55 shown in Fig. 4 is carried by the link 75. The arm 74 is slotted at 78 for sliding of a removable pin 79 carried by an extension 80 on knife-carrying block 41. The pin 79 may be removed when a stationary knife blade is desired.

The platen 17 may be adjusted vertically with respect to fixed platen 16, as by means indicated at 85 (Fig. 4), to vary the thickness of the panel to be formed. The knife-carrying head 41 is carried by the adjustable platen 17 so that the knife blade also moves. A ram-block 43 is provided for each adjustment of panel thickness, or otherwise an adapter face plate is secured to a ram-block of lesser height.

In operation, a variety of panels may be formed. When the grain of veneer 45 is vertical, the faces of the panel show end grain. When the grain of veneer 45 is horizontal, only the edges of the panel show end grain. By alternating strips from vertical to horizontal grain, by means not shown, each strip is cross-banded by the adjacent strip. Where two sheets of veneer are fed together, their tight faces may be back-to-back. Colored effects may be had by feeding strips of different colors, however produced.

Although the direction of movement is horizontal for numerous conveniences, it is to be understood that it may be vertical or otherwise.

Although the invention is primarily useful for wood material and is illustrated and described with reference to wood, it is contemplated that other sheet material may be used, for example, fiber hardboard, paperboard, resin-bonded fiber sheets, and may others now available.

It is to be understood that the method and apparatus are subject to numerous changes and modifications without departing from the spirit and scope of the invention as expressed in the appended claims.

I claim:

1. The method which comprises feeding sheet material generally in its planewise direction, repeatedly severing the fed material into strips of uniform width, feeding said strips as formed laterally from said fed material and forming therewith a pile with a layer of thermosetting binder between adjacent strips, applying mechanical pressure in the direction of piling, and thermosetting the binder.

2. The method which comprises feeding sheet material having a coat of solid thermosetting resin at one face of a sheet generally in its planewise direction, repeatedly severing the fed material into strips of uniform width, feeding said strips as formed laterally from said fed material and forming therewith a pile with a layer of solid thermosetting binder between adjacent strips and as a coat on one of said adjacent strips, applying mechanical pressure in the direction of piling, and thermosetting the binder.

3. The method which comprises feeding planar sheet material having a layer of thermosetting resin at one face of a sheet generally in its planewise direction, repeatedly severing the fed material into strips of uniform width, feeding said strips as formed laterally from said fed material and forming therewith a pile with a layer of thermosetting binder between adjacent strips, forcing said pile as it is assembled in the direction of piling through a space of width substantially equal to the widths of the strips, and thermosetting said binder within said space, whereby to discharge from said space a continuous panel of said strips adhesively bonded facewise.

4. The method which comprises feeding wood veneer having a coat of thermosetting resin at one face of a sheet of veneer generally in its planewise direction, repeatedly severing the fed veneer into strips of uniform width, feeding said strips as formed laterally from the fed veneer and forming therewith a pile with a layer of solid thermosetting binder between adjacent strips and as a coat on one of said adjacent strips, forcing said pile as it is assembled in the direction of piling through a space of width substantially equal to the widths of the strips, and thermosetting said binder within said space, whereby the discharge from said space a continuous body of adhesively bound piled wood strips.

5. The method which comprises feeding wood veneer having a layer of thermosetting resin at one face of a sheet of veneer generally in its planewise direction, repeatedly severing the fed veneer into strips of uniform width, feeding said strips as formed laterally from said fed veneer and forming therewith a pile with a layer of thermosetting binder between adjacent strips, forcing said pile as it is assembled in the direction of piling through a space of width substantially equal to the widths of the strips, and thermosetting said binder within said space, whereby to discharge from said space a continuous body of adhesively bound piled wood strips.

6. The method which comprises feeding several sheets of wood veneer each having an interfacial-binding layer of thermosetting resin at one face of a sheet of veneer generally in its planewise direction, repeatedly severing the fed veneer into strips of uniform width, feeding said strips as formed laterally from said fed veneer and forming therewith a pile with a layer of thermosetting binder between adjacent strips, forcing said pile as it is assembled in the direction of piling through a space of width substantially equal to the widths of the strips, and thermosetting said binder within said space, whereby to discharge from said space a continuous body of adhesively bound piled wood strips.

7. The method which comprises continuously assembling strips of wood all of uniform width and each of uniform thickness in a pile with the grain of all the strips extending in the same direction with a layer of thermosetting binder between adjacent strips by applying in repetition strokes of pressure to a succession of bodies each comprising at least one such strip and thereby placing each body on the end of a pile of like strips with a layer of thermosetting binder between adjacent strips, each addition to the pile effecting an advance movement of the pile, said pile being located and moving in a passageway having a width substantially the same as the width of the strips, whereby appreciable resulting friction resists the force moving the pile and the pile is under compression increasing inwardly from its forming end, and thermosetting said binder at a location in said passageway at which adjacent strips are under compression, whereby to bind the strips together, and whereby to discharge from said passageway a continuous length of adhesively bonded laminated strips as a uniformly thick panel.

8. The method which comprises continuously assembling strips of wood all of uniform width and each of uniform thickness in a pile with the grain of each strip at right angles to the grain of the adjacent strips and with a layer of thermosetting binder between adjacent strips by applying in repetition strokes of pressure to a succession of bodies each comprising at least one such strip and thereby placing the body on the end of a pile of like strips with a layer of thermosetting binder between adjacent strips, each addition to the pile effecting an advance movement of the pile, said pile being located and moving in a passageway having a width substantially the same as the width of the strips, whereby appreciable resulting friction resists the force moving the pile and the pile is under compression increasing inwardly from its forming end, and thermosetting said binder at a location in said passageway at which adjacent strips are under compression, whereby to bind the strips together, and whereby to discharge from said passageway a continuous length of adhesively bonded laminated strips as a uniformly thick panel.

9. The method which comprises feeding thermosetting binder in layer form and adjacent wood in veneer sheet form into a strip-forming region, repeatedly severing the end of said fed material lying in said region into a sequence of strip material of uniform width, applying moving pressure to said strip material as it is formed and thereby placing wood strips on the end of a pile of like strips with a layer of thermosetting binder between adjacent strips, each addition to the pile effecting an advance movement of the pile away from said region, said pile being located and moving in a passageway having a width substantially the same as the width of the strips, whereby appreciable resulting friction resists the force moving the pile and the pile is under compression increasing inwardly from its forming end, and thermosetting said binder at a location in said passageway at which adjacent strips are under compression, whereby to bind the strips together, and whereby to discharge from said passageway a continuous length of adhesively bonded laminated strips as a uniformly thick panel.

10. The method which comprises feeding into a strip-forming region wood in sheet form comprised of at least one sheet of wood veneer having a layer of thermosetting binder on one face, repeatedly severing the end of the fed material lying in said region into a sequence of wooden strip material having a uniform width, applying moving pressure to said strip material as it is formed and thereby placing wood strips on the end of a pile of like strips and thereby providing a layer of said thermosetting binder between adjacent strips, each addition to the pile effecting an advance movement of the pile away from said region, said pile being located and moving in a passageway having a width substantially the same as the width of the strips, whereby appreciable resulting friction resists the force moving the pile and the pile is under compression increasing inwardly from its forming end, and thermosetting said binder at a location in said passageway at which adjacent strips are under compression, whereby to bind the strips together, and whereby to discharge from said passageway a continuous length of adhesively bonded laminated strips as a uniformly thick panel.

11. The method which comprises feeding into a strip-forming region wood in sheet form comprised of at least one sheet of wood veneer having a layer of solid thermosetting binder as a coat on one face, repeatedly severing the end of said fed material lying in said region into a sequence of wooden strip material having a uniform width, applying moving pressure to said strip material as it is formed and thereby placing it on the end of a pile of like strips and thereby providing a layer of said thermosetting binder between adjacent strips, each addition to the pile effecting an advance movement of the pile away from said region, said pile being located and moving in a passageway having a width substantially the same as the width of the strips, whereby appreciable resulting friction resists the force moving the pile and the pile is under compression increasing inwardly from its forming end, and thermosetting said binder at a location in said passageway at which adjacent strips are under compression, whereby to bind the strips together, and whereby to discharge from said passageway a continuous length of adhesively bonded laminated strips as a uniformly thick panel.

12. The method which comprises feeding into a strip-forming region laminated material comprised of at least one sheet of wood veneer and a sheet containing thermosetting binder, repeatedly severing the end of said fed material lying in said region into a sequence of pairs of strips of veneer and binder layer having a uniform width, applying moving pressure to said strip material as formed and thereby placing it on the end of a pile of like pairs of strips and thereby providing a layer of said thermosetting binder between adjacent wood strips, each addition to the pile effecting an advance movement of the pile away from said region, said pile being located and moving in a passageway having a width substantially the same as the width of the strips, whereby appreciable resulting friction resists the force moving the pile and the pile is under compression increasing inwardly from its forming end, and thermosetting said binder at a location in said passageway at which adjacent strips are under compression, whereby to bind the strips together, and whereby to discharge from said passageway a continuous length of adhesively bonded laminated strips as a uniformly thick panel.

13. Apparatus for forming integrated pile-form laminates comprising two space-forming parallel plane platens adapted to be heated to a thermosetting temperature for the hereinafter recited thermosetting resin binder, extension means positioned to extend the platens defining said space and provide an entrance thereto at a temperature below a thermosetting temperature for said resin binder, one extension means terminating in a shearing edge and the other providing a platform extending beyond said shearing edge, means for feeding sheet material and accompanying interfacial thermosetting resin edgewise onto said platform in position to cover said entrance, and means comprising a reciprocating shearing ram arranged in cooperation with said shearing edge to shear said sheet material into strips ahead of it and to push said strips into said space and thereby advance the resulting pile thereof within and through said space, wherein the resin binder may be thermoset to integrate the pile.

14. Apparatus for forming built-up wood panels comprising two parallel plane platens adapted to be heated and providing a space between them, spaced means positioned to extend the faces of said platens and thereby provide an entrance to said space, one of said means projecting beyond the other, means for feeding toward said projecting means and into a position covering said entrance at least one layer of sheet material and an adjacent layer of thermosetting resin to be set when heated between said heated platens, said material being fed substantially edgewise and said resin being carried by a face of said wood for location between each pair of adjacent sheets so fed, and means comprising a reciprocating ram moving on said projecting means to shear said fed wood at the other of said means and thereby repeatedly to form and push a sequence of strips of wood facewise into said entrance as a pile thereof and progressively to compress and move said pile through said space, whereby to set the resin while said strips are compressed.

15. Apparatus for forming built-up wood panels comprising two spaced parallel plane platens adapted to be heated to a thermosetting temperature for a thermosetting binder suitable for bonding wood, means positioned to extend the platen faces and provide an entrance to the space between the platens with a temperature below said thermosetting temperature, said means including a knife blade for one platen and bed plate for the other platen extending beyond the knife blade, a reciprocal ram slideable on said bed plate and of size to enter and fill said entrance and effect a shearing action with said knife blade, means to reciprocate said ram into and out of shearing relation with said knife blade, and means to position sheet material comprised of at least one sheet of wood having a layer of thermosetting binder at one face for biased motion edgewise onto said bed plate in position between said ram and said knife blade, whereby it is repeatedly sheared to provide a sequence of strip material of width equal to the width of the space between said platens, and whereby said resulting strip material is forced into said space during repeated reciprocations of said ram and advanced with compression through said space, and whereby the platens at a thermosetting temperature may effect adhesion of strip to strip in said pile.

16. Apparatus according to claim 15 in which the knife blade is reciprocal in the direction of its cutting edge, and in which said knife blade and said ram are reciprocated in timed relation at the shearing positions thereof by said reciprocating means.

17. Apparatus according to claim 15 having means positioned to push the sheet material after a shearing action off said knife edge for permitting movement thereof to said bed plate between said ram and said knife edge.

18. Apparatus according to claim 16 having means positioned to push the sheet material after a shearing action off said knife edge for permitting movement thereof to said bed plate between said ram and said knife edge.

References Cited in the file of this patent

UNITED STATES PATENTS

| | | |
|---|---|---|
| 1,663,535 | Brandan | Mar. 20, 1928 |
| 2,409,777 | Maurer | Oct. 22, 1946 |
| 2,537,918 | Skoog | Jan. 9, 1951 |